(12) United States Patent
Nakajima

(10) Patent No.: US 9,024,469 B2
(45) Date of Patent: May 5, 2015

(54) MOTOR-DRIVEN REFRIGERATING APPARATUS FOR VEHICLE

(71) Applicant: Denso Corporation, Kariya, Aichi-pref. (JP)

(72) Inventor: Kenji Nakajima, Kariya (JP)

(73) Assignee: Denso Corporation, Kariya (JP)

( * ) Notice: Subject to any disclaimer, the term of this patent is extended or adjusted under 35 U.S.C. 154(b) by 284 days.

(21) Appl. No.: 13/716,594

(22) Filed: Dec. 17, 2012

(65) Prior Publication Data
US 2013/0154356 A1 Jun. 20, 2013

(30) Foreign Application Priority Data

Dec. 19, 2011 (JP) ................................. 2011-277502

(51) Int. Cl.
*B60R 16/033* (2006.01)
*B60H 1/32* (2006.01)

(52) U.S. Cl.
CPC ............ *B60R 16/033* (2013.01); *B60H 1/3222* (2013.01)

(58) Field of Classification Search
CPC ............................ B60R 16/033; B60H 1/3222
USPC .......................................................... 307/9.1
See application file for complete search history.

(56) References Cited

U.S. PATENT DOCUMENTS

| | | | |
|---|---|---|---|
| 6,889,762 B2 | 5/2005 | Zeigler et al. | |
| 7,963,117 B2 * | 6/2011 | Allen et al. | 62/184 |
| 8,078,339 B2 * | 12/2011 | Oakes | 701/1 |
| 8,643,216 B2 * | 2/2014 | Lattin | 307/65 |
| 8,740,104 B2 * | 6/2014 | Bigler et al. | 237/12.3 B |
| 8,863,540 B2 * | 10/2014 | Alston et al. | 62/236 |
| 2008/0072859 A1 * | 3/2008 | Esaka et al. | 123/179.3 |
| 2008/0110189 A1 * | 5/2008 | Alston et al. | 62/236 |

FOREIGN PATENT DOCUMENTS

| | | |
|---|---|---|
| JP | B-2956061 | 7/1999 |
| JP | 2004-222475 | 8/2004 |
| JP | 2004-274920 | 9/2004 |

(Continued)

OTHER PUBLICATIONS

Translation of N (Fukada, Takafumi; JP 2004274920 A ).*

(Continued)

*Primary Examiner* — Rexford Barnie
*Assistant Examiner* — Elim Ortiz
(74) *Attorney, Agent, or Firm* — Harness, Dickey & Pierce, PLC

(57) ABSTRACT

A vehicle has a low-voltage power generator driven by an engine, a standard low-voltage battery and a standard low-voltage electric load. Additional equipment has an additional low-voltage battery for supplying electric power to an additional low-voltage electric load. The additional low-voltage battery is charged with electric power from the low-voltage power generator. The additional equipment further has a high-voltage battery for supplying electric power to a high-voltage electric load, and a converter for converting low-voltage electric power from the low-voltage power generator to high-voltage electric power. When relays are opened during a period in which engine operation is stopped, the electric power is supplied from the additional low-voltage battery to the converter, so that the high-voltage electric power is supplied to the high-voltage electric load, such as a motor-driven compressor.

5 Claims, 6 Drawing Sheets

(56) References Cited

FOREIGN PATENT DOCUMENTS

| JP | 2004274920 A | * | 9/2004 | ................ | H02J 9/06 |
| JP | 2007-288918 | | 11/2007 | | |
| JP | 2007288918 A | * | 11/2007 | | |

OTHER PUBLICATIONS

Translation of O (Fukazawa et al.; JP 2007288918 A).*

Office action dated Nov. 26, 2013 in corresponding Japanese Application No. 2011-277502.

* cited by examiner

MOTOR-DRIVEN REFRIGERATING APPARATUS FOR VEHICLE

CROSS REFERENCE TO RELATED APPLICATION

This application is based on Japanese Patent Application No. 2011-277502 filed on Dec. 19, 2011, the disclosure of which is incorporated herein by reference.

TECHNICAL FIELD

The present disclosure relates to a motor-driven refrigerating apparatus for a vehicle, which is mounted in the vehicle and operated by an electric motor.

BACKGROUND

A motor-driven refrigerating apparatus is known in the art, for example, as disclosed in U.S. Pat. No. 6,889,762, according to which the refrigerating apparatus is mounted in a vehicle and refrigerant is compressed by a motor-driven compressor.

According to another prior art, for example, as disclosed in Japanese Patent Publication No. 2004-222475, an electric power unit for a vehicle is disclosed. According to this prior art, the electric power unit has a lead battery for low-voltage electric power and a lithium ion battery of high-voltage electric power, wherein the electric power is selectively supplied to electric loads.

In a case that electric power is supplied from a low-voltage battery to a motor-driven compressor having a large electric load, it is difficult to operate the motor-driven compressor with its high efficiency due to its large electric current. In the above mentioned prior arts, the electric power is supplied from one or multiple batteries to the electric load. It is difficult in the prior art to supply to each of the electric loads the electric power having voltage adapted to power consumption of the respective electric loads. For example, the motor-driven compressor can achieve its high efficiency when it is driven by the electric power having high voltage of several hundred volts.

A vehicle is normally equipped with an electric-power generator and a battery, which are operated with relatively low voltage, for example, 12 volt or 24 volt. Such electric loads, which are adapted to the low voltage, are not mounted in the vehicle. In some cases, a motor-driven compressor which is operated by high voltage as well as a refrigerating apparatus having such compressor is additionally mounted in the normal vehicle. In such a case, it is desirable to make additional devices and/or apparatuses on a smaller scale.

SUMMARY OF THE DISCLOSURE

The present disclosure is made in view of the above problem. It is an object of the present disclosure to provide a motor-driven refrigerating apparatus for a vehicle, according to which a conventional power supply system normally equipped in the vehicle is effectively used and operating efficiency of the motor-driven compressor can be improved.

It is another object of the present disclosure to provide a motor-driven refrigerating apparatus for a vehicle, according to which a scale of an electric-power apparatus, which is added to a conventional power supply system normally equipped in the vehicle is made smaller, while operating efficiency of a motor-driven compressor can be improved.

According to a feature of the present disclosure, in a refrigerating apparatus for a vehicle having an engine for driving the vehicle, the refrigerating apparatus is operated not only in a period in which the engine is operated but also in a period in which engine operation is stopped.

The refrigerating apparatus comprises:
a low-voltage electric load operated with low-voltage electric power;
a motor-driven compressor operated with high-voltage electric power, voltage of which is higher than that of the low-voltage electric power;
a low-voltage battery for supplying the low-voltage electric power to the low-voltage electric load;
a high-voltage battery for supplying the high-voltage electric power to the motor-driven compressor;
a low-voltage power charging unit for charging the low-voltage battery with the electric power generated during the period in which the engine is operated; and
a high-voltage power charging unit for charging the high-voltage battery with the electric power generated during the period in which the engine is operated.

According to the above feature, the refrigerating apparatus is operated not only in the period in which the engine is operated but also in the period in which the engine operation is stopped. There are provided with the low-voltage battery for supplying low-voltage electric power to the low-voltage electric load and the high-voltage battery for supplying the electric power to the motor-driven compressor, which corresponds to a high-voltage electric load. Since the motor-driven compressor can be operated with the high-voltage electric power, the refrigerating apparatus can be operated with high efficiency.

It is possible to operate the low-voltage electric load and the motor-driven compressor without the converter during the period in which the engine operation is stopped. During the period in which the engine is operated, not only the electric power charged in the high-voltage battery and the low-voltage batteries but also the electric power generated at the low-voltage power generator is supplied to the high-voltage load. At the same time, the electric power generated at the low-voltage power generator is charged into the high-voltage battery as well as the low-voltage batteries. As a result, it becomes unnecessary to regulate the voltage.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
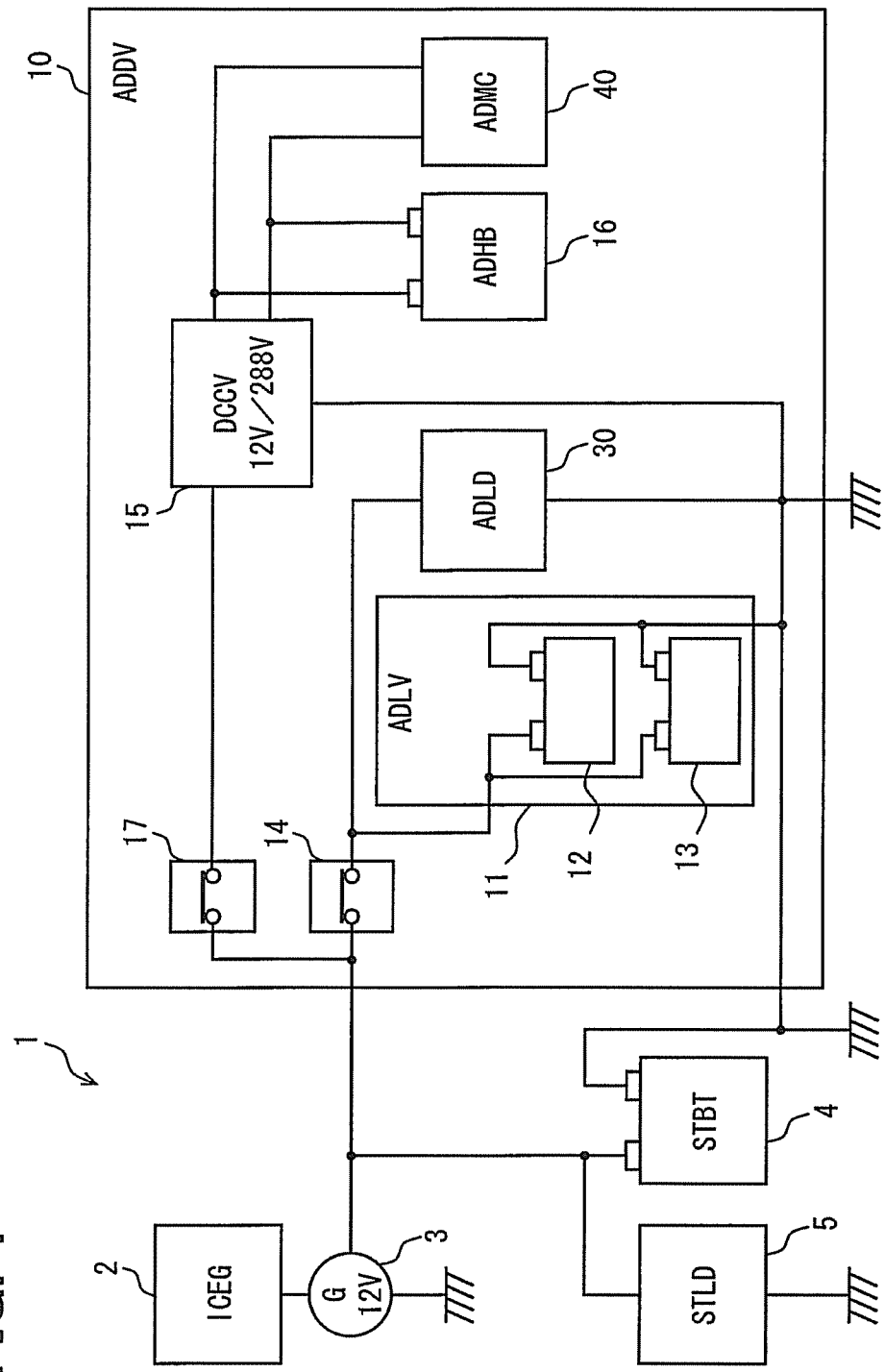
FIG. 1 is a block diagram showing a vehicle system according to a first embodiment of the present disclosure.

The present disclosure will be explained by way of multiple embodiments with reference to the drawings. The same reference numerals are used throughout the embodiments for the purpose of designating the same or similar parts and components.

First Embodiment

FIG. 1 shows a vehicle system 1 mounted in a vehicle. The vehicle has an internal combustion engine (ICEG) 2 (hereinafter, the engine 2) working as a driving source for the vehicle. The present disclosure may be also applied to a hybrid vehicle having an electric motor for driving the vehicle. An output shaft of the engine 2 transmits a driving force of the engine 2 to driving wheels of the vehicle via a transmission apparatus (not shown). Therefore, the vehicle is movable when the engine 2 is in operation, while the vehicle is not movable when the engine 2 is not in the operation. The engine operation is stopped when the vehicle is parked in a parking place or temporally stopped before a traffic lamp. The vehicle system 1 has electric devices mounted in the vehicle and an electric-power supply system for supplying electric power to such electric devices.

The vehicle system 1 has an electric-power generator 3 of low voltage (hereinafter, a low-voltage power generator 3). The low-voltage power generator 3 supplies electric power to electric loads of low voltage (hereinafter, the low-voltage electric loads). The low-voltage power generator 3 generates the electric power, which is adapted to the electric loads of 12 volt.

The vehicle system 1 further includes a standard low-voltage battery (STET) 4 and a standard electric load (STLD) 5. The standard low-voltage battery 4 is mounted in the vehicle for supplying the electric power to other electric loads than an air-conditioning apparatus and a refrigerating apparatus. The standard low-voltage battery 4 is also called as a normal battery 4 or can be further referred to as a re-starting battery 4, because the battery 4 charges the electric power for re-starting the engine 2 and the low-voltage power generator 3. The electric power generated at the low-voltage power generator 3 is charged in the standard low-voltage battery 4. A rated voltage for the standard low-voltage battery 4 is 12 volt. The standard low-voltage battery 4 is one of low-voltage batteries mounted in the vehicle, which are adapted to relatively low voltage. The standard low-voltage battery 4 is a lead battery. Since the lead batteries are widely used for the vehicle as a battery of the vehicle, it is easier to procure the lead battery in the market at a reasonable price.

The electric power is supplied to the standard electric load 5 from the low-voltage power generator 3 as well as the standard low-voltage battery 4. The standard electric load 5 is an electric device(s) or apparatus(s) mounted in the vehicle. The standard electric load 5 includes a starter motor for re-starting the engine 2. For example, the standard electric load 5 includes not only multiple control units for the engine 2 and so on but also other electric devices, such as, a meter device, head lamps, a direction indicating device and so on. The standard low-voltage battery 4 has a battery capacity, which is adapted to operate the standard electric load 5.

Accessory devices or additional devices (ADDV) 10 are mounted in the vehicle. The accessory devices or the additional devices 10 are mounted in the vehicle in a factory of a car manufacturer or mounted afterwards in the market. The accessory or additional devices 10 may include optional products, which will replace vehicle standard devices as replacement parts or which will be additionally mounted in the vehicle. Hereinafter, those of the devices and products are collectively referred to as additional equipment 10.

The additional equipment 10 includes a low-voltage electric load (ADLD) 30, which is operated with low voltage almost equal to that for the standard electric load 5, and a high-voltage electric load (ADMC) 40, which is operated with high voltage higher than that for the standard electric load 5. The additional equipment 10 includes the air-conditioning apparatus for conditioning air in a passenger compartment of the vehicle. The additional equipment 10 is also referred to as the air-conditioning apparatus 10. The air-conditioning apparatus 10 includes a cooling device for cooling the passenger compartment. The air-conditioning apparatus 10 includes a refrigerating apparatus, which is operated not only in a period in which the engine 2 is in operation but also in a period in which the engine 2 is stopped. According to the air-conditioning apparatus 10, it is possible to carry out an air-conditioning operation with the electric power upon request (a switching operation) by a vehicle passenger (s), even when the engine operation is stopped while the vehicle is parked in the parking place.

The additional equipment 10 further includes an additional low-voltage battery (ADLV) 11, a relay 14 in a low-voltage power-supply system, a converter (DCCV) 15 for increasing voltage, a high-voltage battery (ADHB) 16 and a relay 17 in a high-voltage power-supply system. In the present embodiment, the electric-power supply system for the vehicle is formed by the low-voltage power generator 3, the standard low-voltage battery 4, the additional low-voltage battery 11, the converter 15, and the high-voltage battery 16. The electric-power supply system is composed of the low-voltage power-supply system, which supplies the electric power to the standard electric load 5 of the low voltage and the low-voltage electric load 30 of the additional equipment 10, and the high-voltage power-supply system which supplies the electric power to the high-voltage electric load 40. The low-voltage power-supply system is formed by the low-voltage power generator 3, the standard low-voltage battery 4 and the additional low-voltage battery 11. The high-voltage power-supply system is formed by the converter 15 and the high-voltage battery 16. The additional low-voltage battery 11 and the high-voltage battery 16 form an electric-power supply system specialized only for the additional equipment 10, that is, the air-conditioning apparatus.

The additional low-voltage battery 11 directly receives the electric power generated at the low-voltage power generator 3. A rated voltage for the additional low-voltage battery 11 is the same or substantial equal to the rated voltage of the standard low-voltage battery 4. Therefore, the rated voltage for the additional low-voltage battery 11 is 12 volt. The additional low-voltage battery 11 is composed of multiple batteries 12 and 13, which are connected in parallel to each other, so that the additional low-voltage battery 11 may have a larger battery capacity than that of the standard low-voltage battery 4. The additional low-voltage battery 11, which is composed of a lead battery, is connected to the low-voltage electric load 30.

The relay 14 is provided between the additional low-voltage battery 11 and an intermediate point of an electric line connecting the low-voltage power generator 3 to the standard low-voltage battery 4. An operation of the relay 14 is controlled by a control unit 33 included in the low-voltage electric load 30 (explained below). When the control unit 33 detects a condition, in which the additional low-voltage battery 11 should be separated from the low-voltage power generator 3 and the standard low-voltage battery 4, the control unit 33 opens the relay 14. For example, the relay 14 is opened by the control unit 33, when voltage of the standard low-voltage battery 4 becomes lower than a predetermined value during a period in which an operation of the low-voltage power generator 3 is stopped, or when the voltage of the standard low-voltage battery 4 becomes lower than that of the additional low-voltage battery 11. As a result, an over discharge of the electric power can be avoided in the standard low-voltage battery 4. In other words, an operation for re-starting the engine 2 by the standard low-voltage battery 4 can be assured.

The converter 15 is composed of a DC-DC converter of a voltage-increase type. The converter 15 receives direct current of 12 volt and produces direct current of 288 volt. The output of the converter 15 is supplied to the high-voltage battery 16 and the high-voltage electric load 40. Accordingly, the converter 15 forms a high-voltage power source for producing the high-voltage electric power based on the low-voltage electric power from the low-voltage power supply system, which is composed of the low-voltage power generator 3, the standard low-voltage battery 4 and the additional low-voltage battery 11. The converter 15 supplies the high-voltage electric power, which corresponds to dozens of times of the low-voltage electric power.

The high-voltage battery 16 is charged by the converter 15. A rated voltage of the high-voltage battery 16 is the same to that of the high-voltage electric load 40, a rated voltage of which is 288 volt. The high-voltage battery 16 is composed of a lithium ion battery, which can produce high electric power. Although the lithium ion batteries become widespread, they are still more expensive than the lead batteries.

The relay 17 is provided between the low-voltage power-supply system and the converter 15. An operation of the relay 17 is also controlled by the control unit 33. When the control unit 33 detects a condition, in which the low-voltage power-supply system should be separated from the high-voltage power-supply system, the control unit 33 opens the relay 17. For example, the relay 17 is opened by the control unit 33, when the low-voltage power generator 3 is not operated. As a result, the converter 15 produces the high-voltage electric power only when the low-voltage power generator 3 generates the electric power, namely only when the engine 2 is operated. Accordingly, the converter 15 and the relay 17 form the high-voltage power source, which supplies the high-voltage electric power only when the low-voltage power generator 3 generates the electric power or only when the engine 2 is operated. According to the above structure and operation, it is possible to avoid a situation that the electric power charged in the standard low-voltage battery 4 and the additional low-voltage battery 11 is rapidly consumed in the high-voltage power-supply system. Therefore, the operation for re-starting the engine 2 by the standard low-voltage battery 4 can be assured, even when the high-voltage electric load 40 is used during the period in which the power generating operation of the low-voltage power generator 3 is stopped.

The relays 14 and 17 are opened when the engine operation is stopped, namely during a period in which the electric power is not generated by the low-voltage power generator 3. Accordingly, the additional low-voltage battery 11 and the high-voltage battery 16 supply the electric power not to the standard electric load 5 but only to the electric loads included in the additional equipment 10, during the period in which the engine operation is stopped. On the other hand, the standard low-voltage battery 4 supplies its electric power not to electric loads of the additional equipment 10 but only to the standard electric load 5, during the period in which the engine operation is stopped.

In the present embodiment, the standard low-voltage battery 4 and the additional low-voltage battery 11 form the low-voltage power source. In addition, the low-voltage power generator 3, the relay 14 and some other related circuit parts and components form a low-voltage power charging unit, according to which the low-voltage batteries 4 and 11 are charged by the electric power generated during the period in which the engine 2 is operated. Furthermore, the low-voltage power generator 3, the converter 15, the relay 17 and some other related circuit parts and components form a high-voltage power charging unit, according to which the high-voltage battery 16 is charged by the electric power generated during the period in which the engine 2 is operated.

The relay 14 can be also called as a circuit device, which supplies the electric power generated by the low-voltage power generator 3 to the low-voltage battery 11. According to the above structure, the low-voltage batteries 4 and 11 can be charged with the electric power from the low-voltage power generator 3.

The high-voltage battery 16 can be charged by the electric power from the converter 15. During the period in which the engine 2 is operated, not only the electric power charged in the high-voltage battery 16 and the low-voltage batteries 4 and 11 but also the electric power generated at the low-voltage power generator 3 is supplied to the high-voltage load 40. At the same time, the electric power generated at the low-voltage power generator 3 is charged into the high-voltage battery 16 as well as the low-voltage batteries 4 and 11.

In a case that only the high-voltage battery 16 is provided (namely, the low-voltage batteries 4 and 11 are not provided), it becomes necessary for converting the high voltage (e.g. 288 volt) to the low voltage (e.g. 12 volt) in order to operate the low-voltage loads 5 and 30. According to the present embodiment, however, there are provided with two different batteries (that is, the high-voltage battery and the low-voltage battery). As a result, it is not necessary to convert the high voltage to the low voltage.

In the present embodiment, the relay 14, which is included in the low-voltage power charging unit, forms a switch for the low-voltage power-supply system. The switch (the relay 14) is provided between the standard low-voltage battery 4 and the additional low-voltage battery 11. The switch (the relay 14) is closed when the engine 2 is operated so as to connect the standard low-voltage battery 4 to the additional low-voltage battery 11. The switch (the relay 14) is opened when the engine 2 is not in the operation, so as to disconnect the standard low-voltage battery 4 from the additional low-voltage battery 11. As a result, it is possible to avoid a situation that the charged amount of the electric power is deceased in the standard low-voltage battery 4 when the engine operation is stopped.

In the present embodiment, the relay 17, which is included in the high-voltage power charging unit, forms a switch for the high-voltage power-supply system. The switch (the relay 17) is closed when the engine 2 is operated so as to connect the low-voltage batteries 4 and 11 to the converter 15. The switch (the relay 17) is opened when the engine 2 is not in the operation, so as to disconnect the converter 15 from the low-voltage batteries 4 and 11. As a result, it is possible to avoid a situation that the charged amount of the electric power is deceased in the low-voltage batteries 4 and 11 when the engine operation is stopped.

Figure 2:
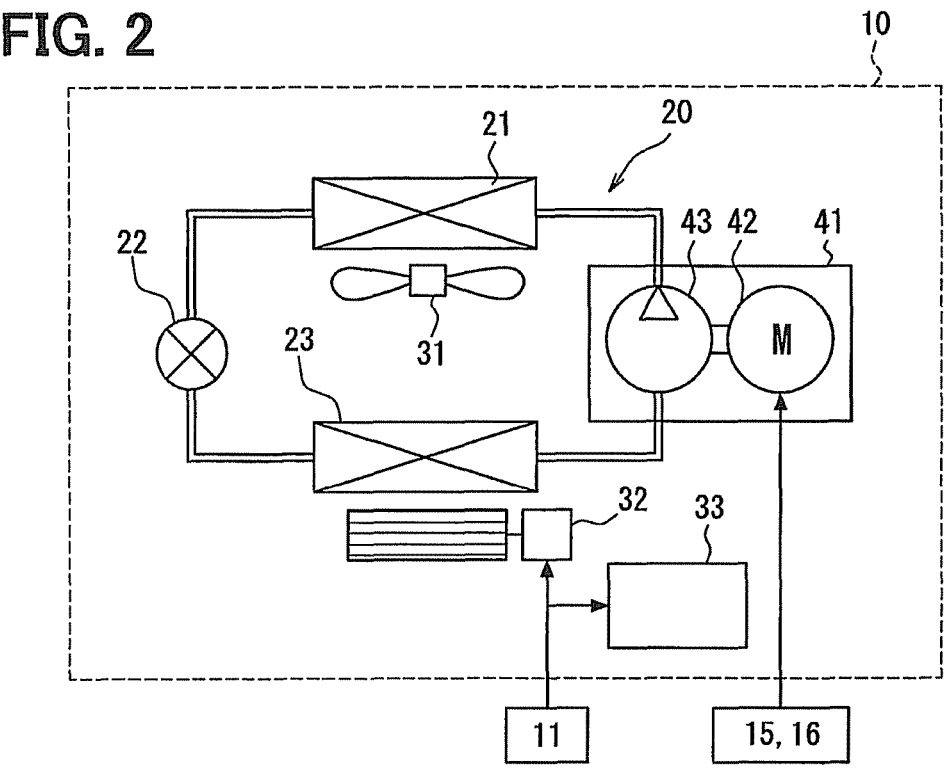
FIG. 2 is a block diagram showing an air conditioning apparatus and a refrigerating apparatus according to the first embodiment.

In FIG. 2, the air-conditioning apparatus 10 included in the additional equipment 10 is composed of a refrigerating apparatus 20. The refrigerating apparatus 20 includes a motor-driven compressor 41, a heat radiating device 21, a de-pressurizing device 22 and a cooling device 23. The motor-driven compressor 41 is composed of an electric motor portion 42 and a compressor portion 43. The electric motor portion 42 is composed of a DC motor. Alternatively, the electric motor portion 42 may be composed of an inverter circuit and a multi-phase AC motor. The compressor portion 43 is driven to rotate by the electric motor portion 42, so as to compress refrigerant circulated in a refrigerating cycle. The compressor portion 43 draws low-pressure refrigerant to compress it, so that high-pressure refrigerant is discharged.

The motor-driven compressor 41 is one of devices included in the high-voltage electric load 40. The electric power is supplied to the motor-driven compressor 41 from the converter 15 and the high-voltage battery 16. The converter 15 and the high-voltage battery 16 supply the electric power, the voltage of which is at least ten times higher than that of the electric power supplied from the additional low-voltage battery 11. Accordingly, it is possible to operate the electric motor portion 42 with its high efficiency, at which heat generation is small.

The heat radiating device 21 is provided at a downstream side of the motor-driven compressor 41. Heat is radiated to the ambient air from the high-pressure refrigerant through heat exchange between the high-pressure refrigerant and the ambient air. The heat radiating device 21 is also called as a condenser. The de-pressurizing device 22 is provided at a downstream side of the heat radiating device 21. The de-pressurizing device 22 de-pressurizes the high-pressure refrigerant and supplies (discharges) the low-pressure refrigerant. The cooling device 23 is provided at a downstream side of the de-pressurizing device 22. The cooling device 23 cools down the air to be supplied to the passenger compartment through heat exchange between the low-pressure refrigerant and the ambient air passing through the cooling device 23. The cooling device 23 is also called as an evaporator. The motor-driven compressor 41 is provided at a downstream side of the cooling device 23.

The air-conditioning apparatus 10 has a first electric fan 31 and a second electric fan 32. The first electric fan 31 supplies the ambient air to the heat radiating device 21. The second electric fan 32 supplies the air for the passenger compartment to the cooling device 23. The air-conditioning apparatus 10 has the control unit (ECU) 33 for controlling operation of electric devices included in the additional equipment 10 (such as, electric parts and components of the air-conditioning apparatus 10). The first electric fan 31, the second electric fan 32 and the control unit 33 correspond to the electric devices included in the additional equipment 10.

The control unit (ECU) 33 is composed of a micro-computer having readable memory devices for storing programs readable by the computer. The memory devices are made of a semiconductor memory or a magnetic disc. The program is carried out by the control unit 33, so that the air-conditioning operation is controlled in accordance with the program.

When the vehicle passenger operates a control panel for the air-conditioning apparatus, the control unit (the ECU) 33 controls the motor-driven compressor 41, the electric fans 31 and 32 and so on, so as to carry out the air-conditioning operation. Since the motor-driven compressor 41 is operated by the high-voltage electric power, the refrigerating apparatus 20 can be operated with high efficiency.

The control unit 33 controls the electric-power supply system (including the relays 14 and 17 and the converter 15), so that the motor-driven compressor 41 is operated by the high-voltage electric power from the converter 15 and the high-voltage battery 16 during the period in which the engine 2 is operated. As a result, the air-conditioning operation can be carried out depending on the high-voltage electric power not only from the high-voltage battery 16 but also from the converter 15 during the period in which the engine 2 is operated.

The control unit 33 further controls the electric-power supply system (including the relays 14 and 17 and the converter 15), so that the motor-driven compressor 41 is operated by the high-voltage electric power only from the high-voltage battery 16 during the period in which the engine operation is stopped. As a result, the motor-driven compressor 41 of the refrigerating apparatus 20 can be carried out depending on the high-voltage electric power only from the high-voltage battery 16 during the period in which the engine operation is stopped.

Furthermore, the control unit 33 controls the electric-power supply system (including the relays 14 and 17 and the converter 15), so that the low-voltage electric load 30 is operated by the electric power only from the additional low-voltage battery 11 during the period in which the engine operation is stopped. According to such operation, it is not necessary to provide a specific device and a control system for supplying the electric power from the high-voltage battery 16 to the low-voltage electric load 30.

In addition, the control unit 33 controls the relays 14 and 17, so that the power supply from the standard low-voltage battery 4 to the additional low-voltage battery 11 and to the converter 15 is cut off during the period in which the engine operation is stopped. According to such control, it is possible to avoid the situation that the electric power charged in the standard low-voltage battery 4 is excessively decreased by the operation of the air-conditioning apparatus 10 during the period in which the engine operation is stopped.

The high-voltage battery 16 is provided for the purpose of supplying the electric power to the high-voltage electric load 40. A capacity for the high-voltage battery 16 can be set at such a value, which is necessary for the power supply to the high-voltage electric load 40. In other words, it becomes possible to reduce the capacity of the high-voltage battery 16.

In the present embodiment, the additional low-voltage battery 11 is provided for supplying the electric power to the low-voltage electric load 30. It is possible to form the low-voltage battery 11 by the lead battery, which is reasonable in price.

As explained above, the capacity of the high-voltage battery 16 can be made smaller, to thereby reduce the cost thereof. It is, therefore, possible to reduce the cost of the additional equipment 10 as a whole, even when the additional low-voltage battery 11 is provided.

Figure 3:
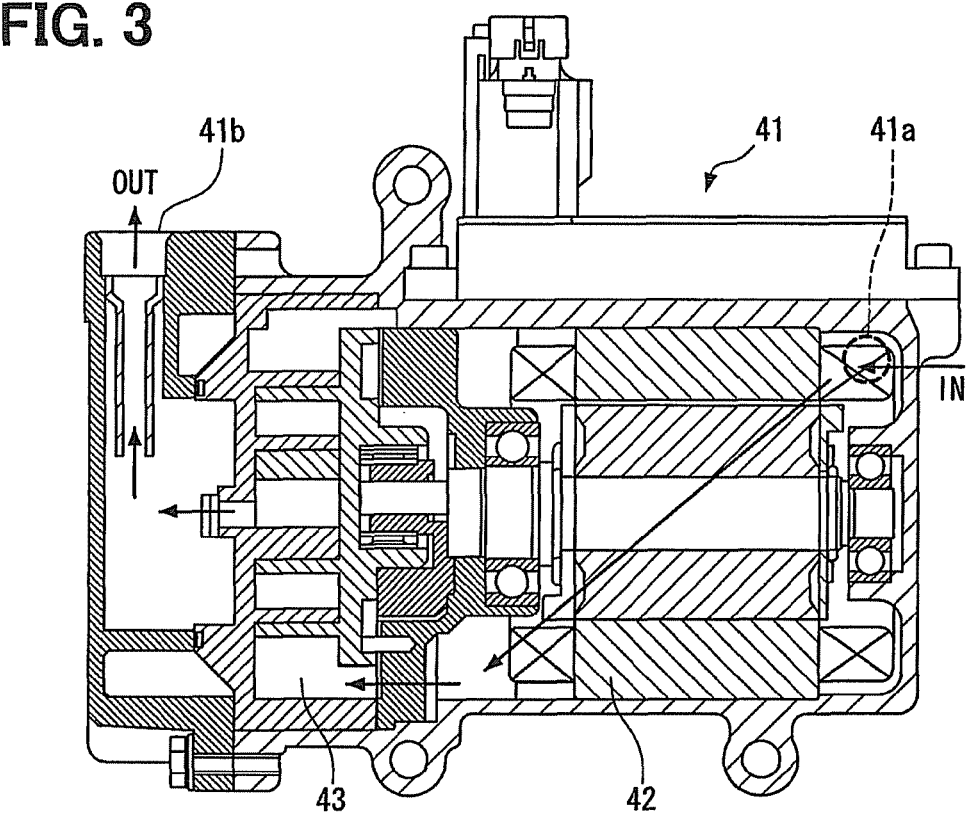
FIG. 3 is a schematic cross sectional view showing a motor-driven compressor of the first embodiment.

As shown in FIG. 3, the motor-driven compressor 41 has an inlet port 41a and an outlet port 41b. The low-pressure refrigerant is sucked into the compressor portion 43 of the motor-driven compressor 41 via the inlet port 41a and high-pressure refrigerant is discharged from the outlet port 41b. The low-pressure refrigerant flows into the compressor portion 43 after having passed through an inside of the motor portion 42. The refrigerant is compressed in the compressor portion 43 and flows out via the outlet port 41b. The low-pressure refrigerant is heated a little by heat of the motor portion 42.

Figure 4:
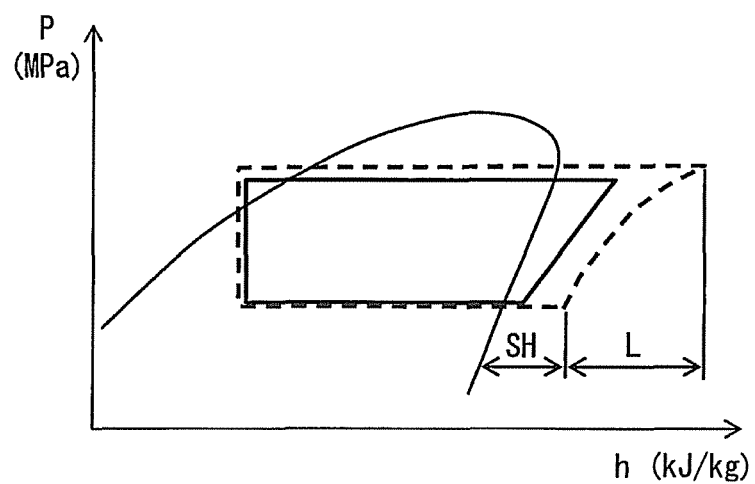
FIG. 4 is a graph showing characteristic of the refrigerating apparatus of the first embodiment.

FIG. 4 shows a P-h diagram of the refrigerating apparatus 20. A vertical axis indicates pressure "P" (MPa), while a horizontal axis indicates a specific enthalpy "h" (kJ/kg). A solid line shows a characteristic line for the refrigerating apparatus 20 of the present embodiment. A dotted line shows a characteristic line for a comparison example, in which a motor-driven compressor is operated with low-voltage electric power having 12 volt or several tens volt. According to the present embodiment, since the amount of heat generated in the motor portion 42 is small, a heating value for the refrigerant is small in a compression stroke or in the vicinity thereof. It is, therefore, possible to operate the refrigerating apparatus 20 with high efficiency.

In the case of the comparison example, large electric current should be supplied to the motor portion so as to generate a driving force necessary for obtaining a predetermined cooling performance. As a result, the heating value is increased in the motor portion. In the motor-driven compressor, the heat generated in the motor portion increases temperature of the refrigerant. For example, in the motor-driven compressor shown in FIG. 3, in which the low-pressure refrigerant is heated by the motor portion, a degree of over heat "SH" is increased as shown in FIG. 4. As a result, a work volume "L" is increased. Even in a case that the motor portion is arranged at a downstream side of the compressor portion, the work volume "L" of the motor-driven compressor is likewise increased, because the high-pressure refrigerant is heated by the motor portion.

According to the present embodiment, however, since the motor portion 42 is operated with the high-voltage electric power, the amount of electric current to be supplied to the motor portion 42 can be made smaller. As a result, it is possible to decrease the heating value in the motor portion 42 and thereby decrease influences caused by the heat generated in the motor portion 42.

Second Embodiment

In the above first embodiment, the additional low-voltage battery 11 is provided for supplying the electric power to the low-voltage electric load 30 of the additional equipment 10.

Figure 5:
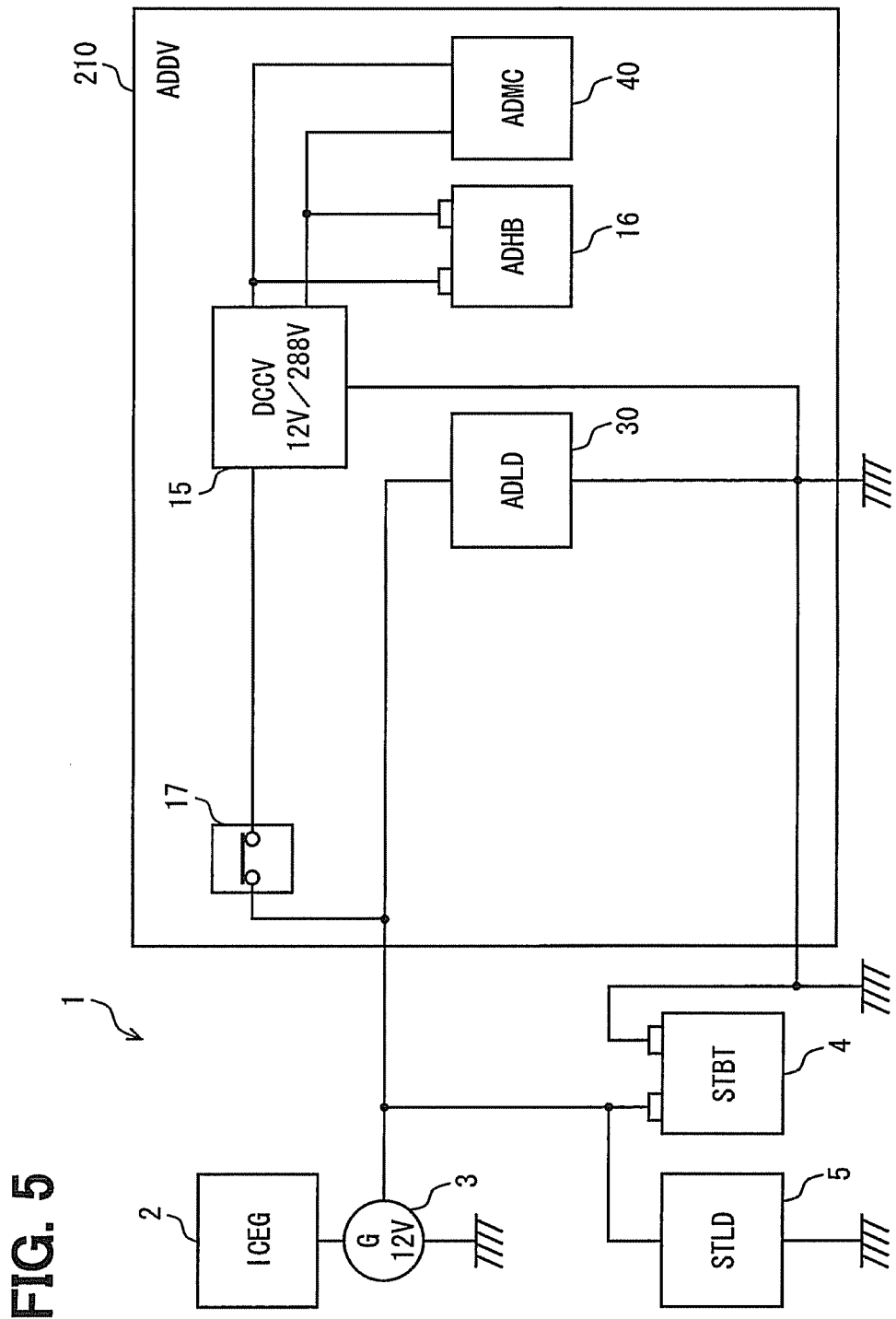
FIG. 5 is a block diagram showing a vehicle system according to a second embodiment of the present disclosure.

According to a second embodiment, as shown in FIG. 5, the additional low-voltage battery 11 and the relay 14 are removed from additional equipment 210. According to the second embodiment, the electric power is supplied from the standard low-voltage battery 4 to the low-voltage electric load 30. The low-voltage battery is formed only by the standard low-voltage battery 4. Since the standard low-voltage battery 4 supplies the electric power not only to the standard electric load 5 but also to the low-voltage electric load 30 of the additional equipment 210, the low-voltage battery 4 has a relatively large capacity.

According to the present embodiment, the control unit 33 controls the power supply system (including the relay 17 and the converter 15), so that the motor-driven compressor 41 is operated by the high-voltage electric power from the converter 15 and the high-voltage battery 16 during the period in which the engine 2 is operated. In addition, the control unit 33 controls the power supply system (including the relay 17 and the converter 15), so that the motor-driven compressor 41 is operated by the high-voltage electric power only from the high-voltage battery 16 during the period in which the engine operation is stopped.

In the present embodiment, the electric power is supplied from the standard low-voltage battery 4 to the low-voltage electric load 30 not only in the period in which the engine 2 is operated but also in the period in which the engine operation is stopped.

The control unit 33 included in the low-voltage electric load 30 may have a monitor device for monitoring remaining amount of the electric power charged in the standard low-voltage battery 4 and the additional equipment 210 (the air conditioning apparatus 210) may be operated so as to avoid such a situation that the remaining amount of the electric power in the standard low-voltage battery 4 does not become smaller than a predetermined value.

Third Embodiment

In the above first and second embodiments, the converter 15 is provided in the power supply system so as to supply the high-voltage electric power to the high-voltage electric load 40 during the period in which the engine 2 is operated.

Figure 6:
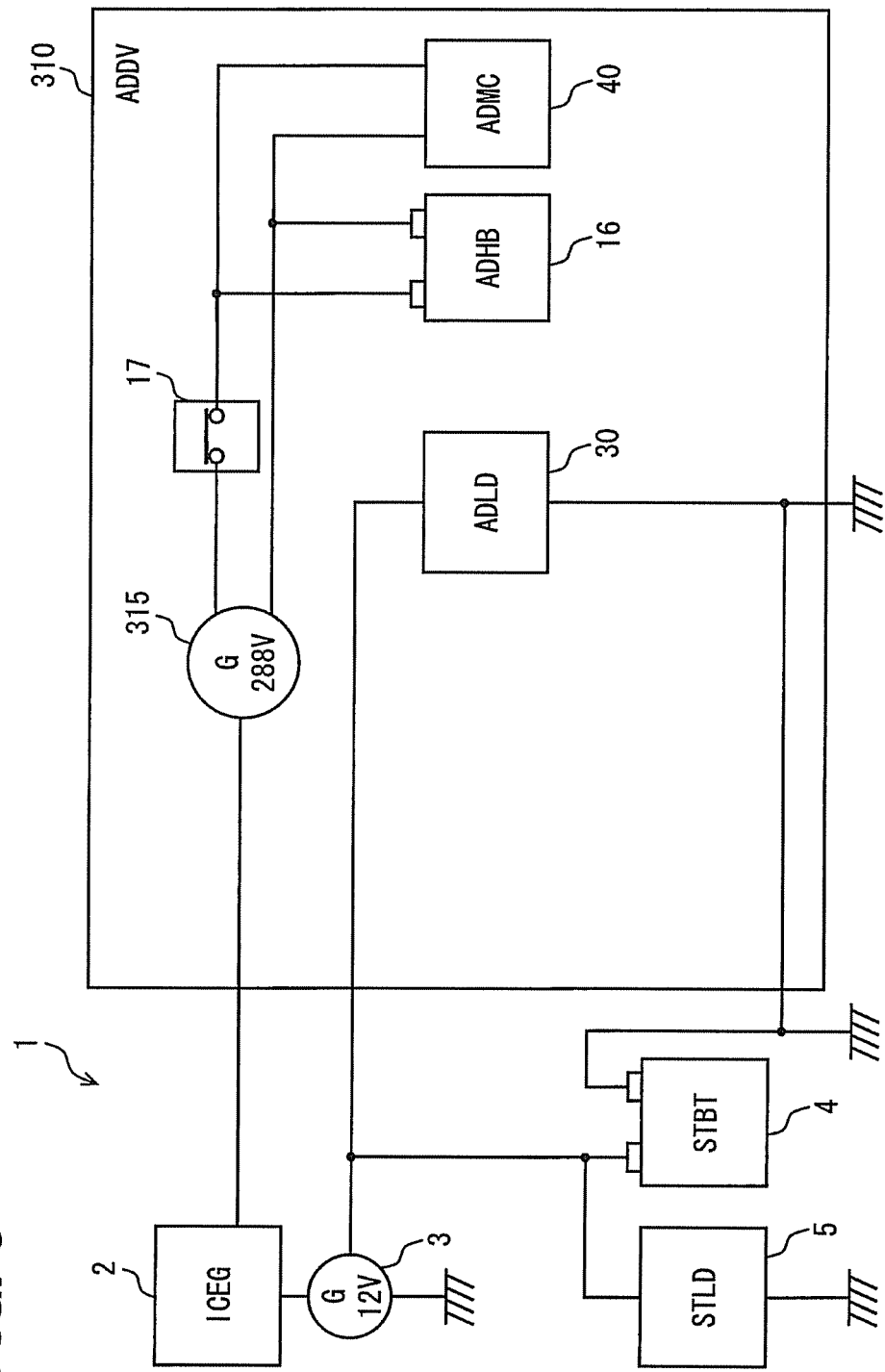
FIG. 6 is a block diagram showing a vehicle system according to a third embodiment of the present disclosure.

According to a third embodiment, however, as shown in FIG. 6, a high-voltage power generator 315 is provided in additional equipment 310 instead of the converter 15. The high-voltage power generator 315 is driven by the engine 2 to generate high-voltage electric power of 288 volt. According to such a structure, the high-voltage power-supply system and the low-voltage power-supply system are completely separated from each other. When the engine 2 is rotated, the high-voltage electric power is supplied from the high-voltage power generator 315 to the high-voltage electric load 40. When the engine operation is stopped, the high-voltage electric power is supplied from the high-voltage battery 16 to the high-voltage electric load 40.

According to the present embodiment, the low-voltage power charging unit includes the low-voltage power generator 3, which is driven by the engine 2 and supplies its outputted electric power to the low-voltage battery 4. The high-voltage power charging unit includes the high-voltage power generator 315, which is driven by the engine 2 and supplies its outputted electric power to the high-voltage battery 16. According to such a structure, it is possible to charge the low-voltage battery 4 with the electric power generated by the low-voltage power generator 3, while it is possible to separately charge the high-voltage battery 16 with the electric power generated by the high-voltage power generator 315. Accordingly, it is not necessary to provide a voltage regulator, such as the converter 15.

Fourth Embodiment

Figure 7:
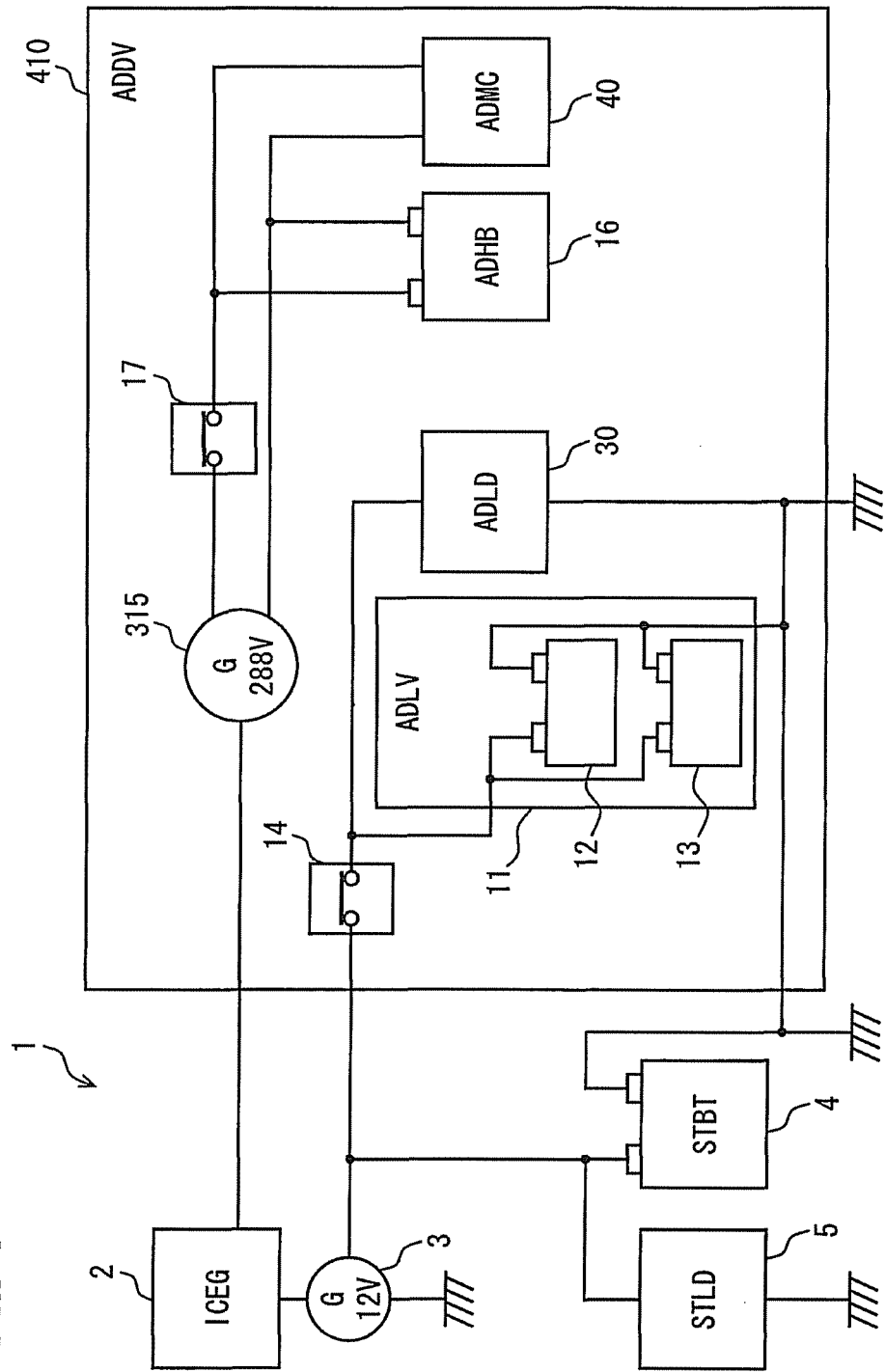
FIG. 7 is a block diagram showing a vehicle system according to a fourth embodiment of the present disclosure.

As shown in FIG. 7, according to a fourth embodiment, the additional low-voltage battery 11 as well as the relay 14 is provided in additional equipment 410, in which the high-voltage power generator 315 is provided like the third embodiment.

Further Embodiments and/or Modifications

The present disclosure should not be limited to the above embodiments but can be modified in various manners without departing from the spirit of the present disclosure.

The above structure and function, which are provided by the control unit 33, can be also realized by either software alone or hardware alone, or a combination thereof. For example, the control unit may be composed of analog circuits.

In the above embodiment, the rated voltage for the standard low-voltage battery 4 and the standard electric load 5 is 12 volt. The rated voltage can be changed from 12 volt to 24 volt.

In the above embodiments, the high-voltage battery 16 is composed of the lithium ion battery. The high-voltage battery 16 may be composed of a nickel metal-hydride battery.

What is claimed is:

1. In a refrigerating apparatus for a vehicle having an engine for driving the vehicle and an electric-power generator, wherein the refrigerating apparatus is operated not only in a period in which the engine is operated but also in a period in which engine operation is stopped, the refrigerating apparatus comprises:

a low-voltage electric load operated with low-voltage electric power;

a motor-driven compressor operated with high-voltage electric power, voltage of which is higher than that of the low-voltage electric power;

a low-voltage battery for supplying the low-voltage electric power not only to a starter motor of the vehicle but also to the low-voltage electric load of the refrigerating apparatus;

a high-voltage battery for supplying the high-voltage electric power exclusively to the motor-driven compressor;

a low-voltage power charging unit for charging the low-voltage battery with the electric power generated by the electric-power generator during the period in which the engine is operated; and a high-voltage power charging unit for charging the high-voltage battery with the electric power generated by the electric-power generator during the period in which the engine is operated, wherein the low-voltage battery is composed of:

a first low-voltage battery for supplying the low-voltage electric power to the starter motor; and a second low-voltage battery for supplying the low-voltage electric power to the low-voltage electric load of the refrigerating apparatus, wherein the low-voltage power charging unit has a first switch, which is provided between the first low-voltage battery and the second low-voltage battery, wherein the first switch is closed during the period in which the engine is operated, in order to connect the first low-voltage battery and the second low-voltage battery to each other, and wherein the first switch is opened when the engine operation is stopped and when voltage of the first low-voltage battery is lower than a predetermined value or lower than voltage of the second low-voltage battery, in order to disconnect the first low-voltage battery and the second low-voltage battery from each other, wherein the high-voltage power charging unit has a second switch and a converter, which are provided between the electric-power generator and the high-voltage battery, wherein the first switch and the second switch are connected to the electric-power generator in parallel to each other, wherein the switch is closed during the period in which the engine is operated, in order to connect the electric-power generator to the high-voltage battery via the converter, and wherein the switch is opened during the period in which the engine operation is stopped, in order to disconnect the electric-power generator and the high-voltage battery from each other.

2. The refrigerating apparatus according to claim 1, wherein the low-voltage battery is composed of a lead battery, and the high-voltage battery is composed of a lithium ion battery or a nickel metal-hydride battery.

3. The refrigerating apparatus according to claim 1, wherein the low-voltage electric load includes;

an electric fan; and a control unit.

4. The refrigerating apparatus according to claim 1, wherein the first switch is disposed directly between the first low-voltage battery and the second low-voltage battery.

5. The refrigerating apparatus according to claim 1, wherein the second switch is connected directly to the electric-power generator and directly to the first low-voltage battery.

* * * * *